United States Patent [19]

Webb et al.

[11] 4,174,602
[45] Nov. 20, 1979

[54] HEADER SUSPENSION AND STABILIZATION MEANS

[75] Inventors: Bryant F. Webb, Ephrata; Charles A. Parrish, New Holland, both of Pa.

[73] Assignee: Sperry Rand Corporation, New Holland, Pa.

[21] Appl. No.: 891,989

[22] Filed: Mar. 31, 1978

[51] Int. Cl.² .......................................... A01D 67/00
[52] U.S. Cl. ................................ 56/208; 56/DIG. 1
[58] Field of Search ................... 56/DIG. 1, 208, 210, 56/14.6

[56] References Cited

U.S. PATENT DOCUMENTS

| 2,971,316 | 2/1961 | Popanoopulo | 56/208 |
| 3,165,872 | 1/1965 | Praca | 56/DIG. 1 |
| 3,238,709 | 3/1966 | Williams | 56/208 |
| 3,448,566 | 6/1969 | Van der Lely | 56/14.6 |
| 3,550,363 | 12/1970 | Halls et al. | 56/208 |
| 3,589,115 | 6/1971 | Taylor et al. | 56/208 |
| 3,599,411 | 8/1971 | Scarnato et al. | 56/208 |
| 3,608,286 | 9/1971 | Lausch et al. | 56/DIG. 1 |
| 3,743,023 | 7/1973 | Bedwell | 56/208 |
| 3,783,594 | 1/1974 | Watt et al. | 56/208 |
| 3,959,957 | 6/1976 | Halls | 56/DIG. 1 |
| 4,127,981 | 12/1978 | Parrish et al. | 56/DIG. 1 |
| 4,137,696 | 2/1979 | Webb | 56/1 |

Primary Examiner—Louis G. Mancene
Assistant Examiner—Paul J. Hirsch
Attorney, Agent, or Firm—John B. Mitchell; Frank A. Seemar; Ralph D'Alessandro

[57] ABSTRACT

A crop harvesting machine has a crop harvesting header, a mobile frame and improved header stabilizing system. The frame is adapted to move across a field in a forward direction and includes upper frame structure extending transversely to the forward direction and a lower wheel frame assembly. The assembly includes a transverse cylindrical member being rotatably mounted to and supporting the upper frame structure. Lift means is provided, being actuatable for moving the lower assembly, and thereby rotating the cylindrical member thereof, relative to the upper frame structure to effectuate raising of the upper frame structure and the cylindrical member relative to the field. A header suspension and lift means includes upper means pivotally interconnecting an upper portion of the header with the upper frame structure and lower elongated means pivotally interconnecting a lower portion of the header with the cylindrical member of the wheel frame assembly. The lower means has a portion which projects rearwardly of the pivotal connection of the lower means with the cylindrical member and underlies the member so as to be engaged by the latter to effect lifting of the header upwardly by the lower means upon rotation of the cylindrical member when the lift means is actuated so as to effectuate raising of the upper frame structure and the cylindrical member relative to the field. A telescoping link extends between and pivotally interconnects the central portion of the cylindrical member and the lower central portion of the header to stabilize the header against excessive lateral movement. The telescoping link may also limit the upper and lower position of the header.

9 Claims, 14 Drawing Figures

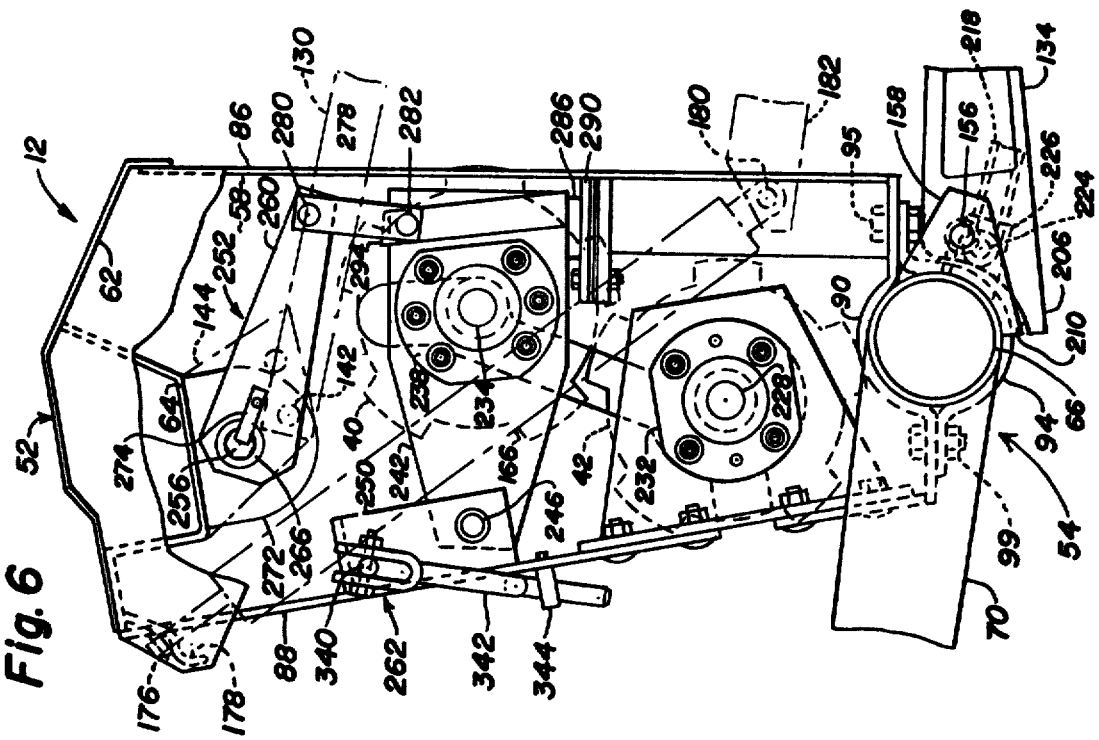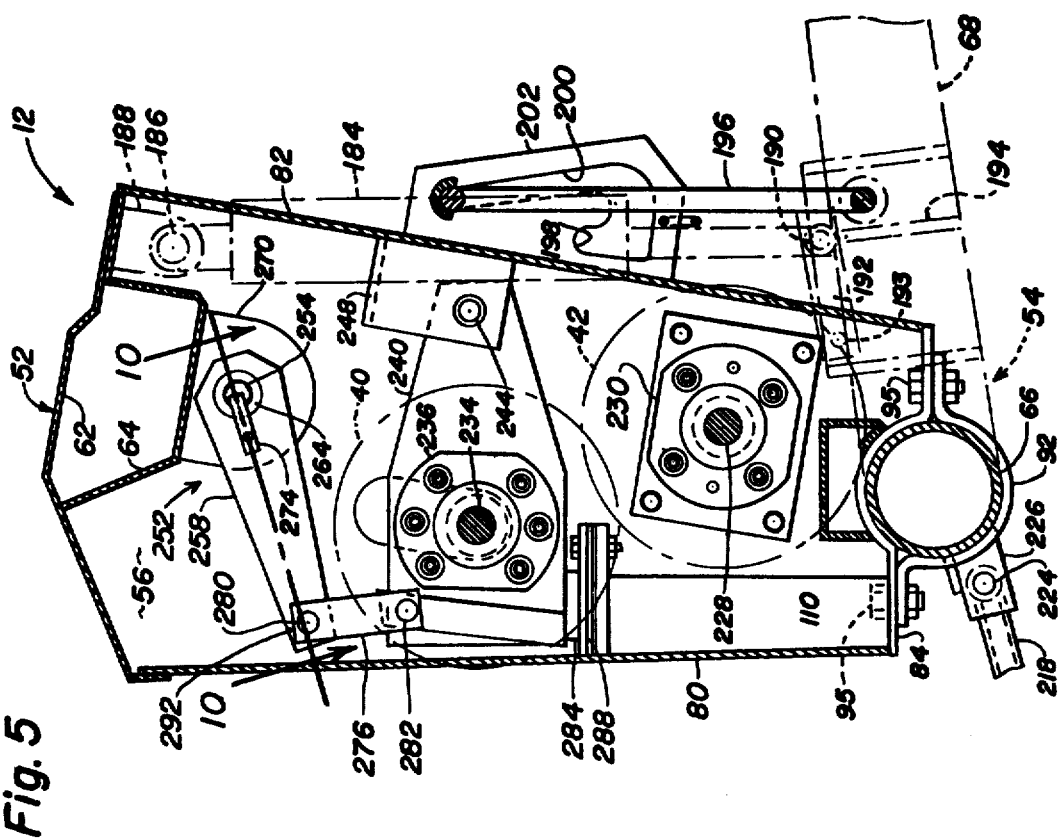

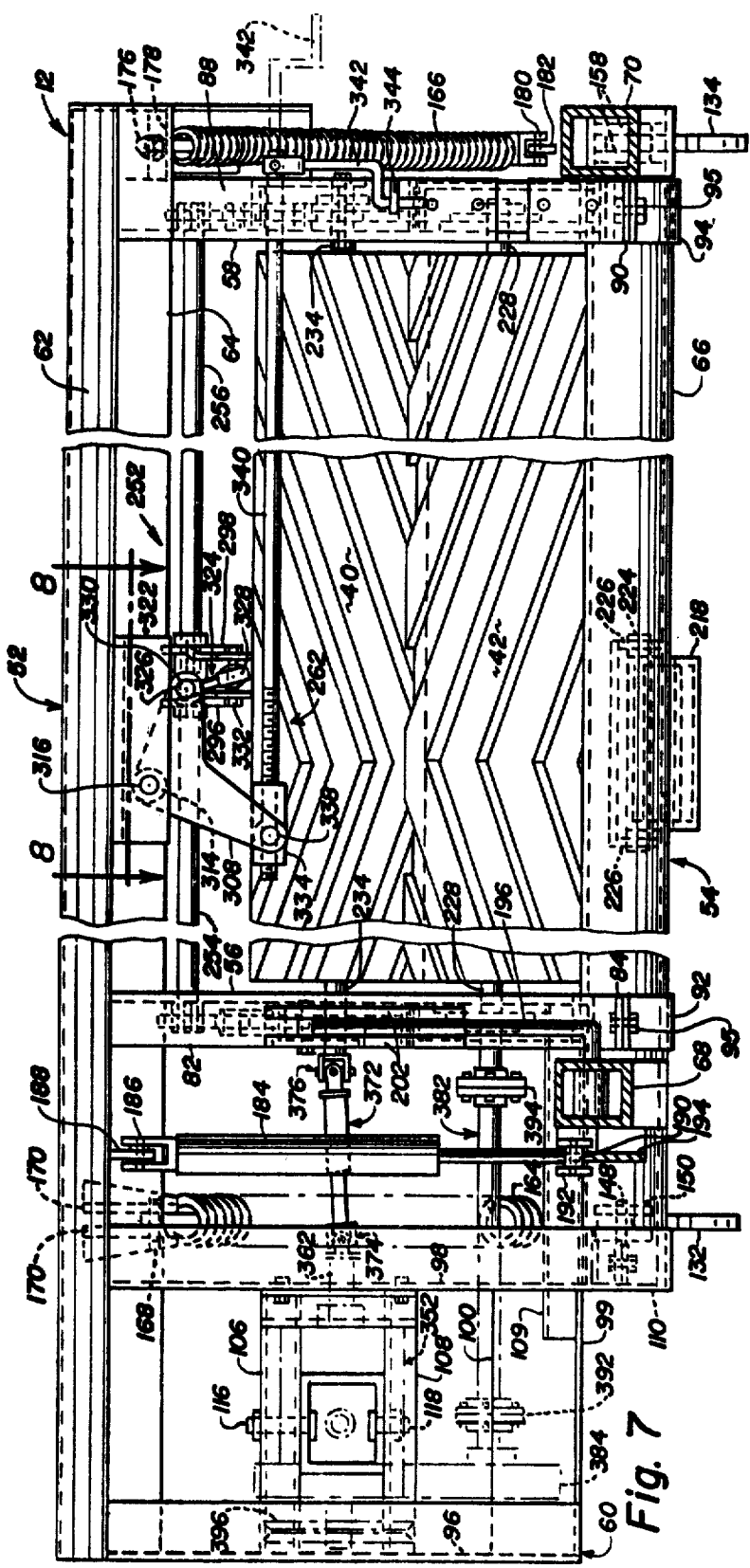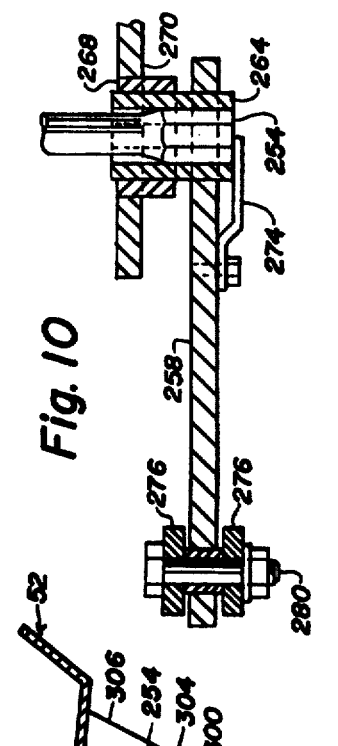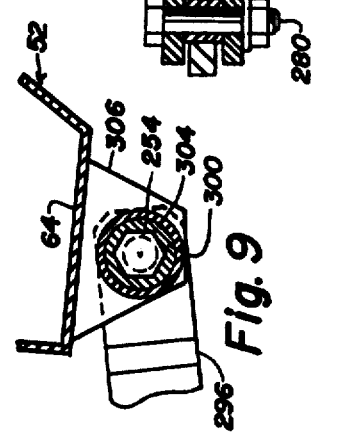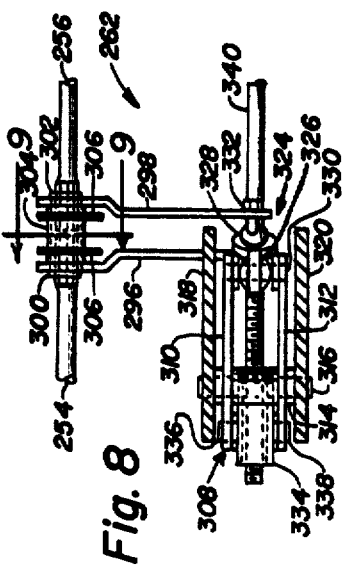

HEADER SUSPENSION AND STABILIZATION MEANS

BACKGROUND OF THE INVENTION

The present invention relates generally to a crop harvesting machine and, more particularly, is concerned with means for improving the lateral stabilization characteristics of a header on the harvesting machine.

Prior art crop harvesting machines, such as mower-conditioners, have a mobile frame and a crop harvesting header suspended on the frame for vertical movement relative thereto. Suspension means on some machines commonly include upper and lower links pivotally interconnecting and extending between the header and the frame. The frame of the machine commonly incorporates a wheel frame assembly which may be pivoted relative to the remainder of the frame to effectuate raising of the machine frame and header relative to the field. Such machines are disclosed and illustrated in U.S. Pat. Nos. 3,517,491; 3,608,286 and 3,797,207.

While these prior art machines are generally sstisfactory for their intended purposes, improvement in the stabilization of the header is desirable to enhance the overall performance and versatility of the machine both during field operation and road transporting thereof.

SUMMARY OF THE INVENTION

The improved header suspension and lift means of the present invention maximixes the height to which the header is lifted above the field during lifting of the machine frame to road transport position from field operating position which advantageously provides additional clearance between the field and the header, while the ability of the header to move vertically in response to changing field contour during harvesting operation is retained.

Accordingly, the present invention broadly relates to a crop harvesting machine having a mobile frame adapted to move across a field in a forward direction and a crop harvesting header suspended from the frame by improved means. The mobile frame includes upper frame structure extending transversely to the forward direction and a lower wheel frame assembly. The lower assembly includes a cylindrical member extending transversely to the forward direction and rotatably mounted to and supporting the upper frame structure. Lift means is provided, being actuatable for moving the lower wheel frame assembly, and thereby rotating the cylindrical member thereof, relative to the upper frame structure to effectuate raising of the upper frame structure and the cylindrical member relative to the field between a lower field operating position and an upper transport position.

The improved header suspension and lift means for disposing the header in a harvesting position adjacent the field when the frame is at its lower field operating position and for lifting the header upwardly relative to the field during effectuation of upward raising of the upper frame structure, includes upper means pivotally interconnecting the upper frame structure with an upper portion of the header and lower elongated means pivotally interconnecting the cylindrical member of the wheel frame assembly with a lower portion of the header. The lower elongated means has a portion which projects rearwardly of the pivotal connection of the lower means with the cylindrical member and underlies the member so as to be engaged by the same to effect lifting of the header upwardly by the lower means upon rotation of the cylindrical member when the lift means is actuated so as to effectuate raising of the upper frame structure and the cylindrical member relative to the field.

More particularly, the elongated lower means is comprised by a pair of spaced apart links and the cylindrical member of the wheel frame assembly has mounting tabs fixed thereon which project generally forwardly from a front side of the cylindrical member when the frame is at its lower field operating position. The links are respectively pivotally connected at their rear ends to the tabs and include on their rear ends respective portions which project rearwardly of the tabs and in underlying relationship to the cylindrical member. The rearwardly projecting link portions have arcuate-shaped top surfaces which are generally concentric with and face the cylindrical member and spaced therebelow when the frame is at its lower field operating position.

Still further, the header includes a pair of opposite sides and a cutterbar extending transversely between the sides. The lower spaced apart links are respectively pivotally interconnected at their forward ends to the header sides at locations generally forwardly and above the opposite ends of the cutterbar.

The improved header suspension and lift means further includes header stabilizing means in the form of a pair of telescopible members extending between and pivotally interconnecting a generally central portion of the cylindrical member and a lower generally central portion of the header.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

For a better understanding of the invention as well as other objects and further features thereof, reference is made to the following detailed disclosure of the invention taken in conjunction with the accompanying drawings thereof wherein:

FIG. 5 is an enlarged fragmentary left side elevational view of the left portion of the frame structure of the machine which mounts the left ends of the conditioner rolls of the machine as taken along line 5—5 of FIG. 3;

FIG. 6 is an enlarged fragmentary right side elevational view of the right portion of the frame structure of the machine which mounts the right ends of the conditioner rolls of the machine;

FIG. 7 is an enlarged rear elevational view taken along lines 7—7 of FIG. 3, with portions of the machine being broken out;

FIG. 8 is a fragmentary plan view partly in section taken along line 8—8 of FIG. 7;

FIG. 9 is an enlarged fragmentary sectional view taken along line 9—9 of FIG. 8;

FIG. 10 is an enlarged fragmentary sectional view taken along line 10—10 of FIG. 5;

DETAILED DESCRIPTION OF THE INVENTION

In the following description, right hand and left hand references are determined by standing at the rear of the machine and facing in the direction of forward travel. Also, in the following description, it is to be understood that such terms as "forward", "left", "upwardly", etc., are words of convenience and are not to be construed as limiting terms.

Figure 1:
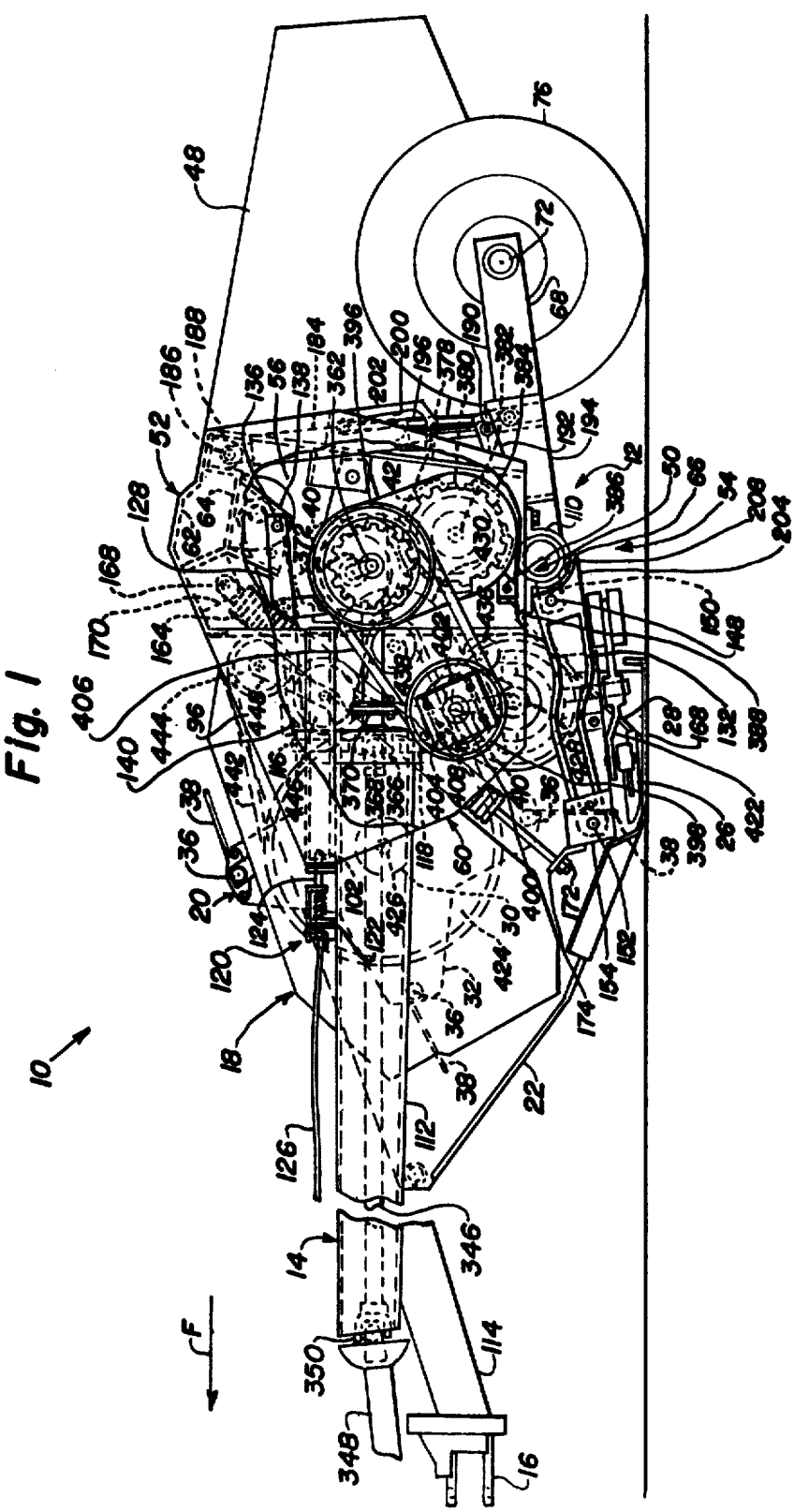
FIG. 1 is a left side elevational view of a pull-type crop harvesting machine embodying the principles of the present invention, with portions of the machine being broken out.
Figure 2:
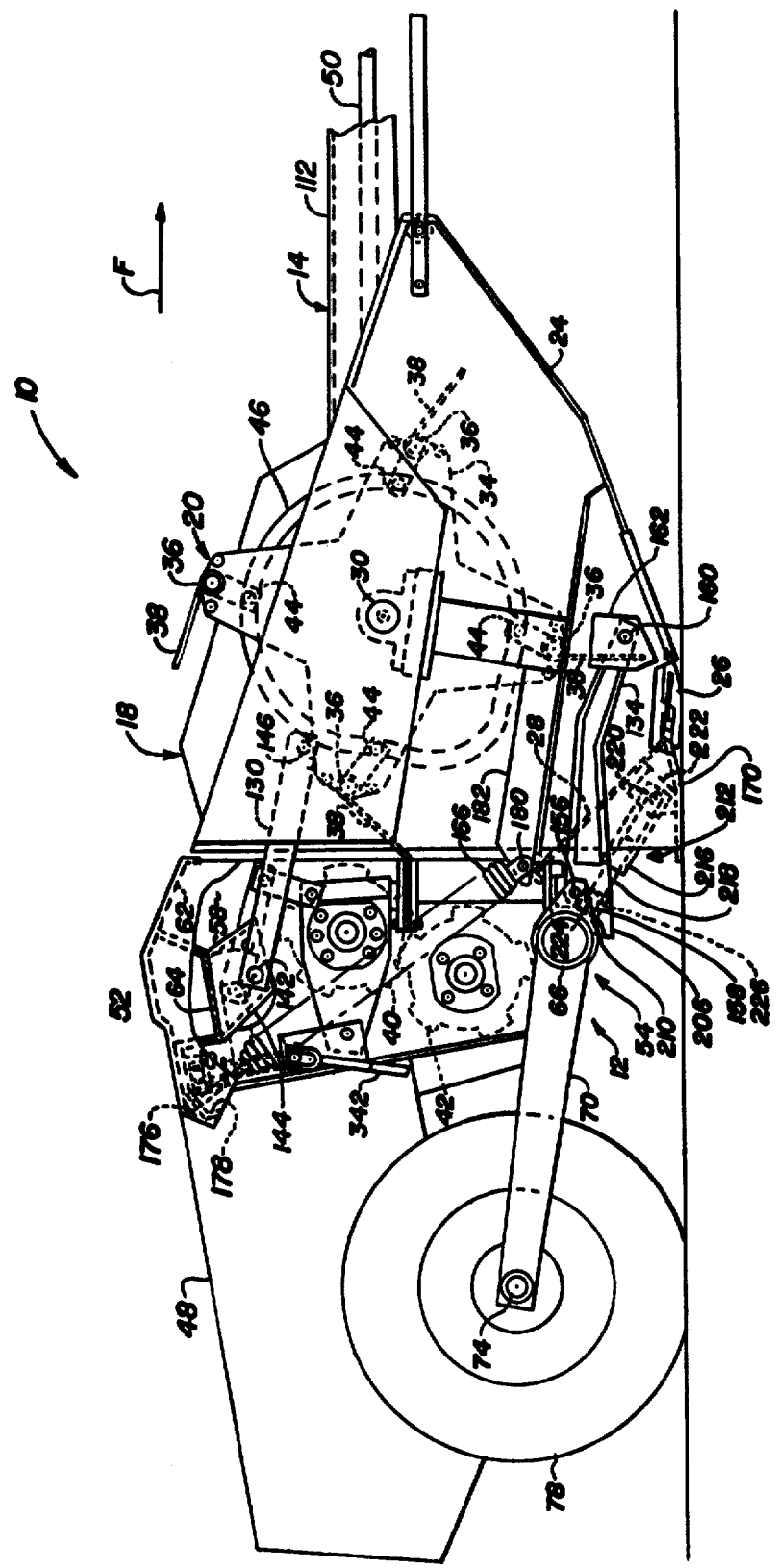
FIG. 2 is a right side elevational view of the machine on a somewhat larger scale than that of FIG. 1, with portions of the machine being broken out.
Figure 3:
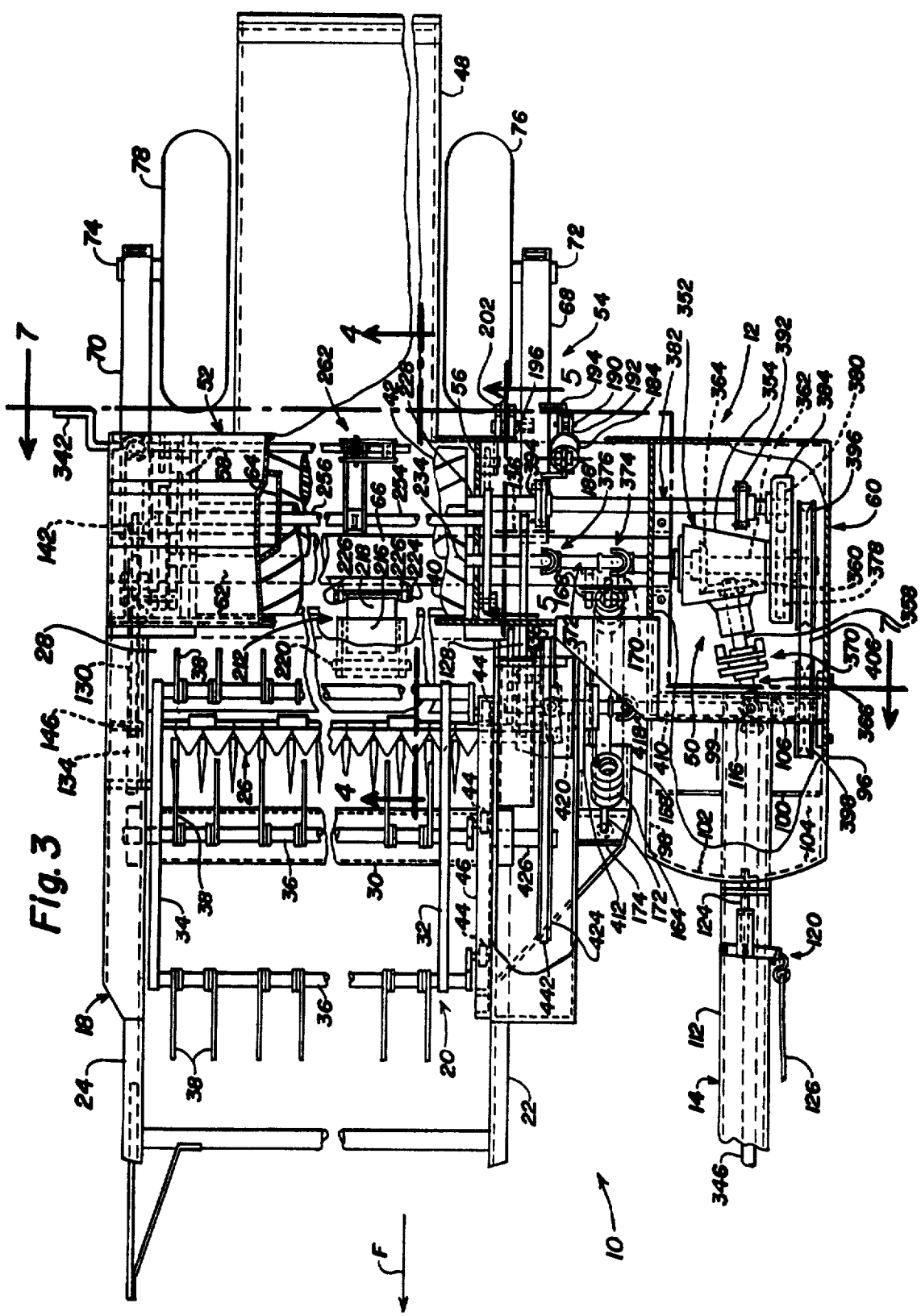
FIG. 3 is a top plan view of the machine on a scale falling between that of FIGS. 1 and 2, with portions of the machine being broken out.

Referring now to the drawings, and particularly to FIGS. 1 through 3, there shown a pull-type crop material harvesting machine, such as a mower-conditioner being indicated generally by the numeral 10, disposed in its normal harvesting position ready for movement across a field to perform crop harvesting operations when operatively connected to and towed by a tractor or the like. The harvesting machine 10 includes a mobile frame 12 which generally extends in a transverse relationship to the direction F of forward travel of the machine across the field during the performance of harvesting operations. A longitudinally extending tongue 14 is pivotally connected at its rear end to an inboard portion of the frame 12 and has a clevis 16 on its forward end adapted to be coupled to the drawbar (not shown) of the towing tractor (not shown).

An elongated header 18 is disposed forwardly of the frame 12 and extends generally transversely to the forward direction of travel F and generally parallel to the frame 12. The header 18 is suspended from the transverse mobile frame 12 so as to be able to vertically float on the field relative to the frame 12 and thereby follow the field contour as the machine 10 is advanced across the field during harvesting operations.

For harvesting standing crop material from the field, the header 18 is provided with a reel 20 transversely extending between, and rotatably mounted at its opposite ends to, opposing left and right side sheets 22,24 of the header and a cutterbar 26 mounted along the forward edge of an upwardly and rearwardly inclined floor 28 of the header 18 at a transversely-extending position spaced below the reel 20 and just above the field. The reel 20 is comprised of a central shaft 30 which adjacent its opposite rotatably mounted ends respectively mounts spiders 32,34 which rotatably support between and about the peripheries thereof a plurality of tine bars 36. The bars 36 each have a series of spaced apart tines 38 fixed therealong. As the reel 20 is rotated in counterclockwise fashion when viewed in FIG. 1, the tines 38 will engage the incoming standing crop and sweep it rearwardly over the cutterbard 26 and move the crop, after it is severed from the field by the cutterbar 26, rearwardly over the floor 28.

For conditioning the cut crop prior to its return back to the field, a pair of upper and lower intermeshing crop conditioner rolls 40,42 are mounted for counter-rotation (in the direction of the arrows in FIG. 4) relative to each other within the frame 12 in a position extending transversely to the forward direction F and generally rearwardly of, above, and in close proximity to the rear edge of the header flow 28. The cut crop being swept over the floor 28 by the reel tines 38 is received between the rolls 40,42. As the tines 38 approach the nip between the conditioner rolls 40,42, the tine bars 36 are caused to rotate slightly clockwise due to the path of movement of cam rollers 44 attached to the left ends of the respective bars 36 which follow a cam track plate 46 disposed adjacent the left side sheet 22 of the header 18. Such slight clockwise rotation of the tine bars 36 effects optimum orientation of the tines 38 relative to the conditioner rolls so as to facilitate stripping of crop material from the tines 38 by the upper roll 40 which is disposed somewhat forwardly of the lower roll 42. The crop material upon receipt between the rolls 40,42 is conditioned in a known manner. Then the conditioned crop is propelled by the rotating rolls 40,42 rearwardly below a windrow forming structure 48 extending rearwardly from the frame 12 and deposited back on the field.

For transmitting the rotary power of a power takeoff shaft (not shown) of the towing tractor to the reel 20, cutterbar 26 and conditioner rolls 40,42, a drive arrangement, generally designated 50, is disposed along the tongue 14 and at the inboard portion of the mobile frame 12.

The mobile frame 12 of the pull-type crop harvesting machine 10 basically includes an upper hollow transverse or cross frame structure 52 (FIGS. 1 through 7 and 12), a transverse lower wheel frame assembly 54 (FIGS. 1 through 7, 11 and 12), left and right spaced apart side members 56,58 (FIGS. 1 through 7) extending vertically between the upper frame structure 52 and lower frame assembly 54 which rotatably mount the conditioner rolls 40,42 therebetween, and a box-like housing 60 (FIGS. 1, 3, 7, 11, 12 and 13) extending vertically between the left end portions of the upper frame structure 52 and lower frame structure 54 and protruding longitudinally forwardly thereof for supporting components of the drive arrangement 50 which transmit rotary power to the reel 20, cutterbar 26 and conditioner rolls 40,42 and for pivotally mounting the rear end of the tongue 14.

As seen in FIGS. 1 through 7 and 12, the upper hollow cross frame structure 52 is formed by an elongated plate-like top wall member 62 which spans the entire length of the transverse frame 12 and a channel member 64 which extends along and is fixed to the underside of the top wall member 62 so as to reinforce the same.

As illustrated in FIGS. 1 through 7, 11 and 12, the lower wheel frame assembly 54 is formed by a cylindrical cross pipe 66 and a pair of left and right spaced apart wheel arms 68,70 which extend generally perpendicular to the pipe 66. As clearly seen in FIG. 11, the left arm 68 is fixed at its forward end to the pipe 66 at a location spaced inwardly from the left end of the pipe 66, while the right arm 70 is fixed at its forward end to the right end of the pipe 66. Both of the arms 68,70 extend generally rearwardly in similar fashion frame the pipe 66 and have spindles 72,74 mounted on the rear ends thereof which, in turn, respectively rotatably mount ground wheels 76,78 about a common horizontal axis defined by the spindles 72,74 and which extends parallel to the horizontal axis of the pipe 66.

The left and right spaced apart side members 56,58, as best seen in various ones of FIGS. 5 through 7, respectively extend in planes which are parallel to the forward direction F of travel of the machine 10, are plate-like in construction, and have front, rear and bottom edge flanges 80,82,84 and 86,88,90 extending outwardly therefrom. The respective upper edges of the plate-like side members 56,58 are configured to both engageably receive the channel member 64 and engage the underside of the top wall member 62 and are fixed to the same such as by welding along the lines of engagement therewith. The frame side members 56,58 are thus fixed to and vertically depend from the upper cross frame structure 52 at a predetermined spaced apart distance, and central portions of the respective lower edges and bottom flanges 84,90 of the side members 56,58 are semi-circular shaped and concentric with the cylindrical shape of the lower cross pipe 66, such that the side members 56,58 seat upon the upper surface of the cross pipe 66 at respective locations inwardly of and adjacent to the securements of the forward ends of the wheel arms 68,70 to the cross pipe 66. As seen in FIGS. 4, 5, 6, 7 and 11, left and right rigid straps 92,94 having respective semi-circular central portions concentric with the cylindrical shape of the cross pipe 66 surround the under surface of the latter at the respective locations of the side members 56,58 and bottom flanges 84,90 along the pipe 66 and are fastened to the bottom flanges 84,90 by bolts 95 adjacent the front and rear sides of the pipe 66 so as to provide a rotatable connection of the pipe 66 to the lower edges of the side members 56,58.

Referring to FIGS. 1, 3, 7 and 13, the box-like housing 60 is formed by spaced apart outer and inner vertical side walls 96,98, a bottom wall 99 extending between and interconnecting the lower horizontal edges of the side walls 96,98, a lower upwardly and forwardly inclined front wall 100 connecting the front horizontal edge of the bottom wall 99 and extending side walls 96,98, an arcuate shaped front plate 102 extending between and interconnecting the front vertical edges of the side walls 96,98, an upper downwardly and forwardly inclined front wall 104 extending between and interconnecting the upper front downwardly inclined edges of the side walls 96,98, and a pair of upper and lower spaced apart horizontal cross braces 106,108 extending between and interconnecting intermediate portions of the side walls 96,98. The left end portion of the upper hollow cross frame structure 52 of the transverse mobile frame 12 is coextensive with and connected to the rear edge of the upper front wall 104 and extends between and interconnects the rear upper edges of the side walls 96,98. In such manner the box-like housing 60 is supported in depending fashion by the upper hollow cross frame structure 52. The box-like housing 60 is further supported from the left side member 56 by a channel member 109 which is fixed at its right end to the lower end of the left side member 56 and extends parallel to and above the left end portion of the cylindrical cross pipe 66 and through the inner vertical side wall 98 of the housing 60 for a short distance so as to overlie a portion of the housing bottom wall 99. The left end portion of the channel member 109 is fixed to both the inner side wall 98 and the bottom wall 99 of the housing 60. The left end of the cross pipe 66 is also rotatably mounted to the channel member 109 adjacent the box-like housing 60 by a semi-circular portion of a rigid strap 110 being fastened to the channel member 109.

The tongue 14 is formed by an elongated straight hollow main portion 112 being rectangular in cross section and a short front portion 114 which is fixed on the front end of the main portion 112 and extends in downwardly and forwardly inclined fashion therefrom. The clevis 16 is attached to the front end of the front tongue portion 114. As seen in FIG. 7, the tongue 14 is pivotally mounted about a vertical axis at the rear end of its straight main portion 112 by fasteners 116,118 which couple the rear end of portion 112 respectively to the upper and lower spaced apart horizontal cross brace 106,108 located within the forward intermediate portion of the box-like housing 60.

The tongue 14 is laterally shiftable between angular positions located respectively adjacent to and remote from the header 18 and may be held at any of such positions by a releasable latch mechanism 120 mounted on the tongue 14 immediately forwardly of the arcuate front plate 102 on the box-like housing 60. As seen in FIG. 3, the tongue 14 is disposed in an intermediate position. The tongue 14 is shifted to any one of its remote positions relative to the header 18 when setting up the machine 10 for field operation, while it is shifted to its adjacent position relative to the header 18 to set up the machine for road transport. When the tongue 14 is in one of its remote positions, the header 18 is disposed in a position offset to the right of the towing tractor, whereby the tractor will not run over the standing crop to be harvested by the machine 10. When the tongue 14 is in its adjacent position, the machine 10 trails more or less directly behind the tractor.

The arcuate front plate 102 has holes (not shown) formed therethrough at the extreme left and right end portions thereof which define the respective remote and adjacent positions of the tongue 14 relative to the header 18. The arcuate curvature of the plate 102 coincides with the lateral path along which the adjacent portion of the tongue 14 moves when it is shifted laterally between the remote and adjacent positions.

The latch mechanism 120 is of a conventional construction generally known in the art and need not be described in great detail. Suffice it to say that the mechanism 120 includes an upstanding bracket 122 mounted on the portion of the tongue 14 adjacent the front plate 102 which, in turn, supports a latch pin 124 which is spring biased toward the front plate 102. The pin 124 is supported for horizontal reciprocatory movement toward and away from the front plate 102 and insertable through one of the holes in the front plate 102 when the tongue 14 has been laterally shifted to bring the pin 124 into alignment therewith. A rope 126 which extends forwardly along the tongue 14 to within the reach of the tractor operator is interconnected at its rear end to the latch pin 124. Therefore, by merely pulling forward on the rope 126, the pin 124 may be withdrawn from a respective one of the position holes in the front plate 102. Then, by maneuvering the tractor relative to the machine 10 the tongue 14 may be laterally shifted between its positions relative to the header 18. Once the tongue 14 has reached its new position, the rope 126 is released and the latch pin 124 will insert into the respective one of the holes in the front plate 102 corresponding to the new tongue position.

The header 18 is suspended from the transverse mobile frame 12 so as to be able to vertically float on the field relative to the frame 12 and thereby follow the field contour as the machine 10 is advanced across the field during harvesting operations. The suspension and lift means includes a pair of left and right laterally spaced apart upper links 128,130 and a pair of left and right laterally spaced apart lower links 132,134. The upper and lower links comprise a generally parallel four-bar linkage system which pivotally interconnects the header 18 to the mobile frame 12 at a position forwardly thereof such that the header 18 may be moved in a generally vertical direction toward and away from the field surface.

Figure 12:
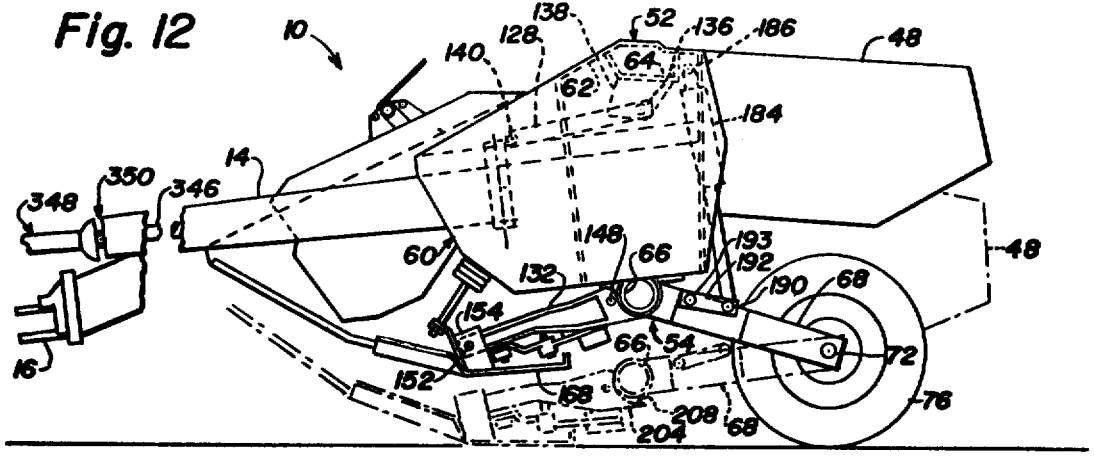
FIG. 12 is a left side elevational view of the machine similar to that of FIG. 1, except on a smaller scale than that of FIG. 1 and with the machine being shown in a raised transport position instead of a lowered field operating position as seen in FIG. 1.

As seen in FIGS. 1, 3, and 12, the left upper link 128 is pivotally connected at its rear end at 136 to a left forwardly-slanted bracket 138 which is attached to and depends from the channel member 64 of frame structure 52 adjacent the outer side of left side member 56 of the mobile frame 12. The front end of the left upper link 128 is pivotally connected at 140 to the upper rear portion of the outer side of the left side sheet 22 of the header 18.

As seen in FIGS. 2, 3, 4 and 6, the right upper link 130 is pivotally connected at is rear end at 142 to a right forwardly-slanted bracket 144 which is attached to and depends from the channel member 64 of frame structure 52 adjacent the outer side of right side member 58 of the mobile frame 12. The front end of the right upper link 130 is pivotally connected at 146 to the upper rear portion of the outer side of the right side sheet 24 of the header 18.

As seen in FIGS. 1, 7, 11 and 12, the left lower link 132 is pivotally connected at its rear end portion at 148 between a left pair of spaced apart forwardly-projecting mounting tabs 150 being fixed on the front side of the left end portion of the cylindrical cross pipe 66 of the wheel frame assembly 54 of the mobile frame 12. The front end of the left lower link 132 is pivotally connected at 152 to left bracket structure 154 which is fixed to and extends laterally outwardly from the lower central portion of the outer side of the left side sheet 22 of the header 18. In such arrangement, the pivotal connection 152 of the front end of the left lower link 132 to the header 18 is located above and slightly forwardly of the left end of the cutterbar 26.

As seen in FIGS. 2, 3, 4, 6, 7 and 11, the right lower link 134 is pivotally connected at its rear end portion at 156 between a right pair of spaced apart forwardly-projecting mounting tabs 158 being fixed on the front side of the right end portion of the cylindrical cross pipe 66 of the wheel frame assembly 54 of the mobile frame 12. The front end of the right lower link 134 is pivotally connected at 160 to right bracket structure 162 which is fixed to and extends laterally outwardly from the lower central portion of the outer side of the right side sheet 24 of the header 18. In such arrangement, the pivotal connection 160 of the front end of the right lower link 134 to the header 18 is located above and slightly forwardly of the left end of the cutterbar 26.

To facilitate flotation of the header 18 on the field, the suspension and left means also includes a pair of spaced apart resilient springs 164,166 which support most of the weight of the header 18. The remaining weight of the header 18 is supported on the field by a pair of spaced apart ground engaging skid shoes 168,170 being fixed on the lower central end portions of the respective side sheets 22,24 of the header 18.

The left flotation spring 164, as seen in FIGS. 1, 3 and 7, being generally aligned vertically above the left lower link 132, is pivotally connected at its rear end at 168 between a pair of spaced apart tabs 170 which are attached to and depend from the frame structure 52 of the mobile frame 12. The left spring 164 extends in an inclined fashion downwardly and forwardly and is coupled at its forward end at 172 to an upstanding brace 174 on left bracket structure 154 which is attached to the left side sheet 22 of the header 18.

Figure 4:
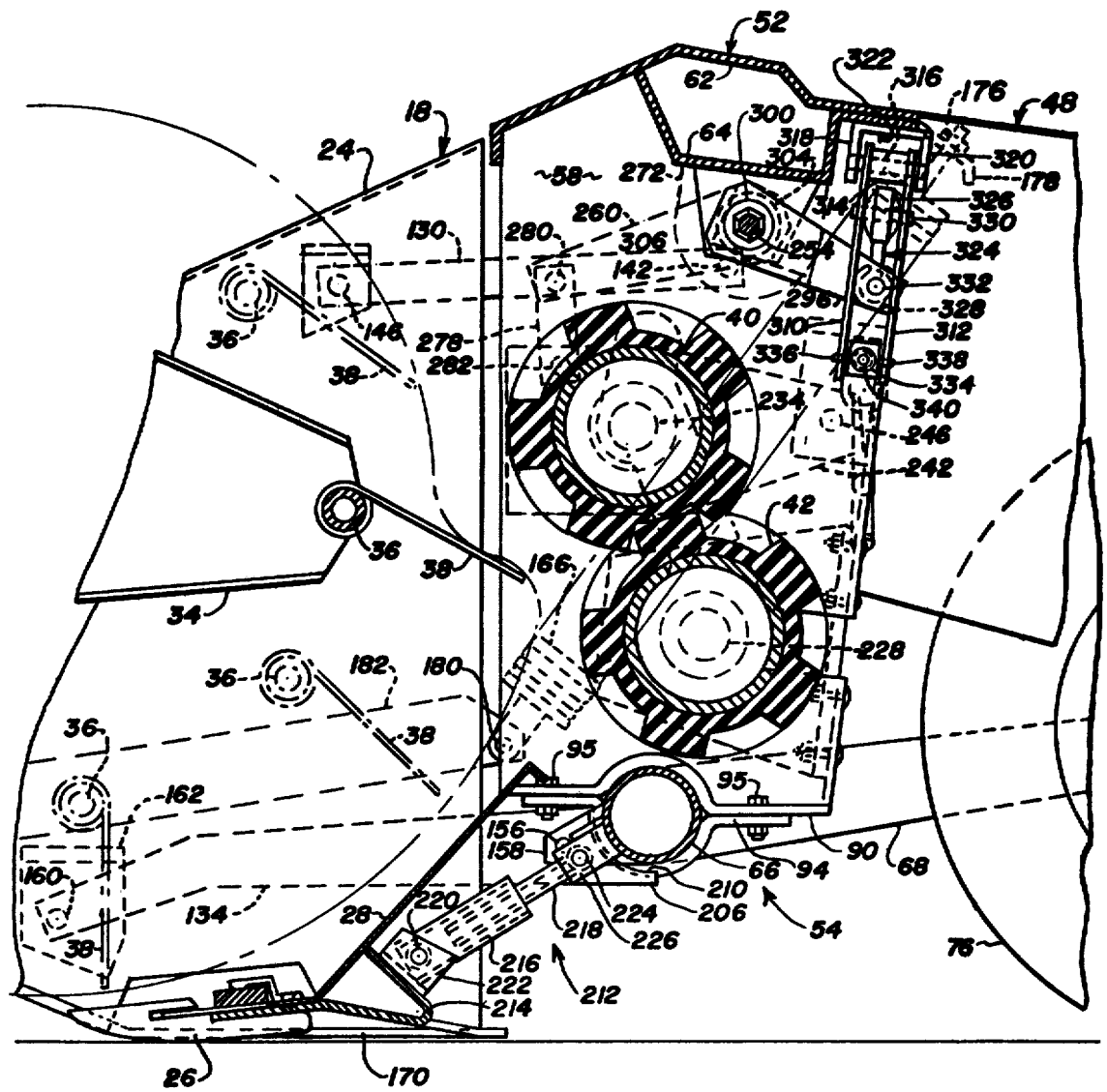
FIG. 4 is an enlarged fragmentary sectional view taken along line 4—4 of FIG. 3.

The right flotation spring 166, as seen in FIGS. 2, 4 and 7, being generally aligned vertically above the right lower link 134, is coupled at its rear end at 176 to a tab 178 fixed to and depending rearwardly and downwardly from the frame structure 52 of the mobile frame 12. The right spring 166 extends in an inclined fashion downwardly and forwardly and is coupled at its forward end at 180 to the rear end of a horizontal brace 182 fixed on the outer side of the right side sheet 24 of the header 18.

To facilitate raising and lowering the header 18 and the frame 12 relative to the field, a lift mechanism in the form of a hydraulic cylinder 184 is provided as seen in FIGS. 1, 3, 5, 7 and 12, being coupled between the frame structure 52 and the left wheel arm 68. The upper anchor end of the cylinder 184 is pivotally connected at 186 to a tab 188 which is connected to and depends downwardly from the frame structure 52, while the lower piston rod end of the cylinder 184 is pivotally connected at 190 to the rear end of a lever arm 192 being pivotally connected at its forward end at 193 to and aligned in overlying relationship with a bracket 194 fixed on the outer side of the left wheel arm 68.

When the hydraulic cylinder 184 is actuated (pressurized) by the operator through operation of suitable hydraulic controls (not shown) from its retracted position as seen in FIG. 1 to its extended position of FIG. 12, relative movement occurs between the lower wheel frame assembly 54 and the remaining rigidly interconnected parts of the mobile frame 12, such being the upper hollow cross frame structure 52, the left and right spaced apart side members 56,58 and box-like housing 60. As the hydraulic lift cylinder 184 extends, the lower wheel frame assembly 54 of the mobile frame 12 is pivoted upwardly about a common horizontal axis defined by the wheel spindles 72,74, with the cross pipe 66 of the assembly 54 concurrently rotating slightly in a clockwise direction (as viewed in FIGS. 1 and 12) within the rigid mounting straps 92,94 and 110 respectively on the left and right side members 56,58 and the box-like housing 60 of the mobile frame 12 as the pipe 66 elevates. Also, the aforementioned rigidly interconnected parts of the frame 12 are caused to elevate as a unit concurrently with the rotating and elevating cross pipe 66 away from the wheel arms 68,70 of the assembly 54 from a lower field operating position of FIG. 1 (and broken line position of FIG. 12) to an upper solid line road transporting position of FIG. 12. By relieving the hydraulic pressure within the cylinder 184, the latter is allowed to retract due to the weight of the above-mentioned rigidly interconnected parts of the mobile frame 12 and of the conditioner rolls 40,42 mounted therein, whereby the rigidly interconnected frame parts move downwardly as a unit toward the wheel arms 68,70 of the wheel frame assembly 54 from the upper slid line position of FIG. 12 to the lower position of FIG. 1 (and broken line position of FIG. 12). When the cylinder 184 is fully extended, a transport lock line 196 pivotally mounted on the left wheel arm 68 adjacent the cylinder 184 may be moved into a lower notch portion 198 of each of a pair of aligned slots 200 formed in a pair of spaced apart plates 202 fixed on and extending rearwardly from the left side member 56. The link 196 will then maintain the frame 12 in its raised position when the pressure in cylinder 184 is relieved.

When the wheel frame assembly 54 is pivoted upwardly relative to the aforementioned remaining rigidly interconnecting parts of the frame 12, wherein cross pipe 66 of wheel frame assembly 54 concurrently is lifted and rotates within rigid mounting straps 92,94 and 110, so as to raise the aforementioned rigidly interconnected frame parts as a unit, header lift assist means of the header suspension and lift means in the form of a pair of projections 204,206, each of which is provided on a rear end of one of the lower links 132,134, become engaged with the bottom side of the rotating and elevating cross pipe 66 of the wheel frame assembly 54 and cause the header 18 to be elevated concurrently with the rigidly interconnected frame parts and the cross pipe 66.

Normally, when the frame 12 is in its lower position of FIG. 1 (and FIG. 12 as shown in broken line form), each of the projections are spaced slightly below the cross pipe 66. Once clockwise rotation and lifting of the cross frame pipe 66 is initiated to lift the remainder of frame 12, the respective tabs 150,158 which pivotally mount the rear ends of the lower links 132,134 begin to rotate and elevate with the pipe 66 relative to the lower links 132,134 until the projections come into contact with the lower side of the pipe 66. Until the latter happens, the header 18 does not elevate with the frame 12. However, once contact occurs between the arcuate top surfaces 208,210 of the projections 204,206 and clockwise rotation and elevation of the cross pipe 66 is continued, the wheel frame assembly 54 and the lower links 132,134 act as a single unit and the further rotation and elevation of the pipe 66 now cause the lower links 132,134 to swingably move upwardly therewith and raise the header 18 and, furthermore, to raise the header 18 upwardly at a proportionately greater rate than the rate at which the remaining rigidly interconnected parts of the frame 12 are raised. As a result, at its fully raised position, the header 18 has been raised through a greater distance over that of the cross pipe 66 of the wheel frame assembly 54 such that ground clearance between the header 18 and the field is maximized. It should be noted that when the header 18 is at its lower position of FIG. 1, the locations of the projections 204,206 relative to the cross pipe 66 do not interfere with the ability of the lower links 132,134 to swing upwardly or downwardly about pivotal connections 148,156 when the header 18 moves vertically upon encountering an obstruction or depression in the field.

Figure 11:
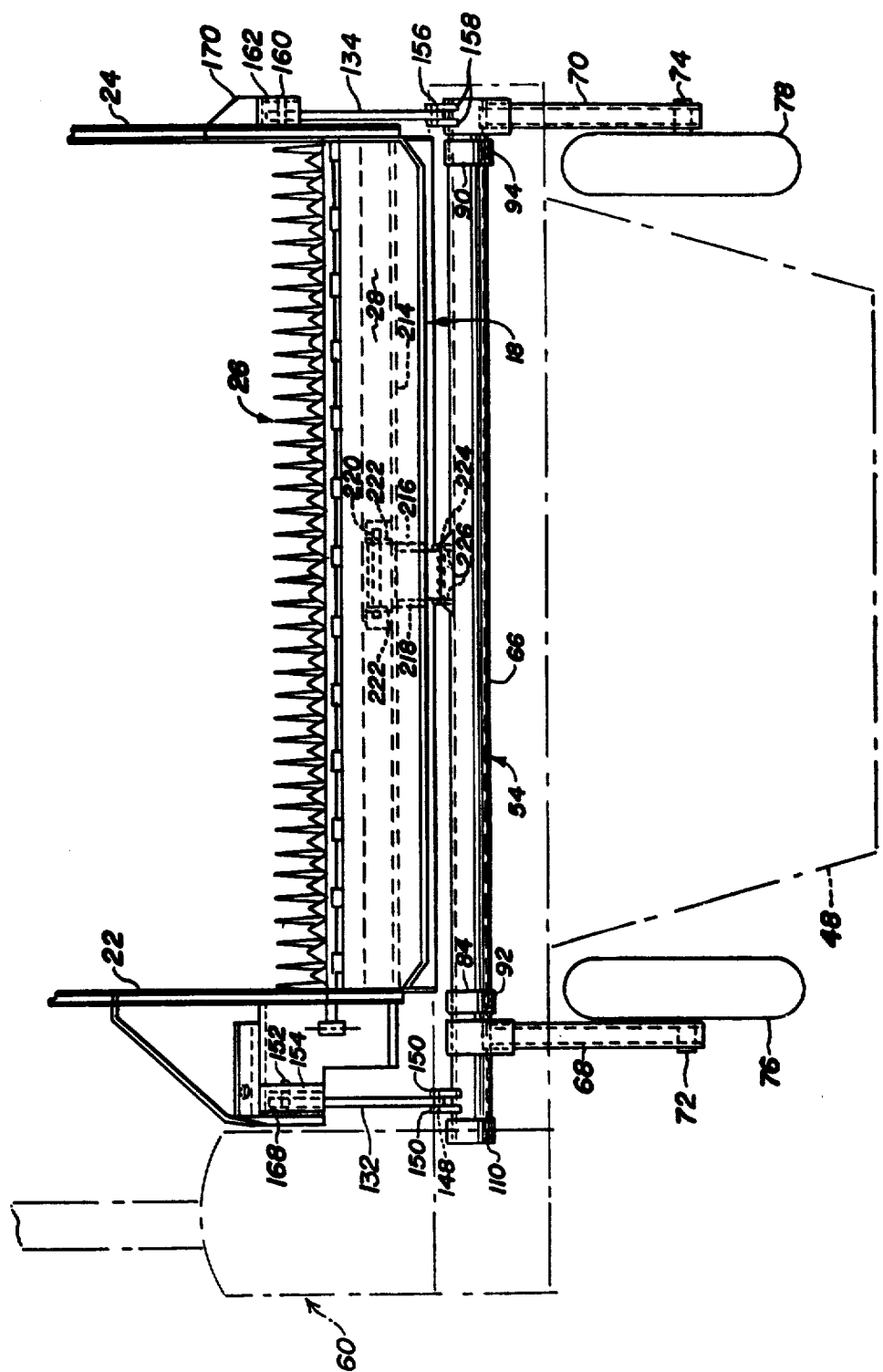
FIG. 11 is a plan view of the frame pipe, wheel arms, wheels, floor and cutterbar of the header, the lower links and the middle stabilizer link of the machine as seen from below the conditioner rolls, with the overall outline of the machine being shown in broken line form.

For stabilizing the header 18 against the effect of any laterally directed forces which may impinge thereon, the header suspension and lift means further includes a telescopible assembly 212 provided at a central location between the cross pipe 66 and a lower portion of the header 18, as seen in FIGS. 2 through 7 and 11. More particularly, a cross channel member 214, as clearly seen in FIGS. 4 and 11, is fixedly mounted to and extends along the underside of the header floor 28. The telescopible assembly 212 is comprised by a front sleeve section 216 with telescopically receives a rear bar section 218. The front end of the front sleeve section 216 is pivotally connected at 220 between a pair of upstanding spaced apart tabs 222 being fixed at a central location on an upper side of the cross channel member 214. The front end of the rear bar section 218 is received through the rear end of the front sleeve section 216. The rear end of the rear bar section 218 is pivotally connected at 224 between a pair of forwardly projecting tabs 226 being fixed at a central location on generally the forward side of the cross pipe 66 of the wheel frame assembly 54 of the mobile frame 12. The telescoping relationship between the sections 216,218 accomodates the vertical movement of the header 18 relative to the frame 12 while still providing the lateral stabilizing function. While it is contemplated that a single assembly, such as 212, will provide sufficient lateral stability in most cases, it is reasonable to expect certain designs, especially very long and large headers, to employ two or even more such devices. The number of stabilizing units used will depend primarily upon the mass of the header and the selected size of stabilizer components.

Figure 14:
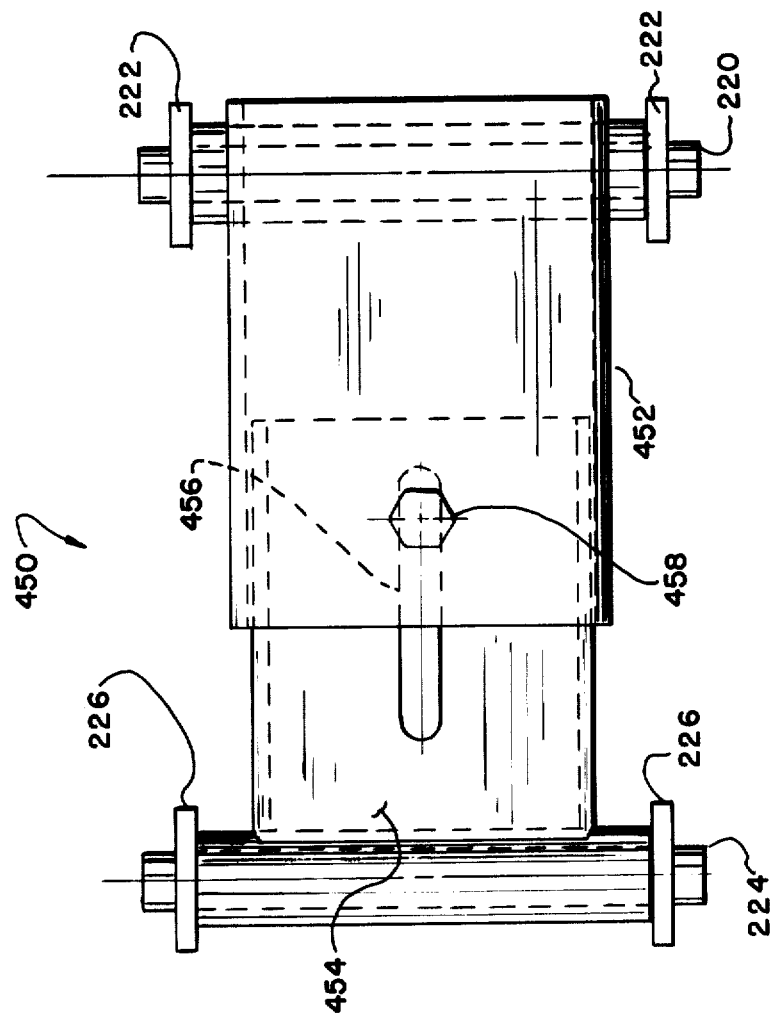
FIG. 14 is an enlarged top plan view of a modified telescoping stabilizing member, similar to element 212 in FIGS. 2 through 7 and 11.

FIG. 14 shows a modification, 450, of assembly 212 which provides for the upper and lower positional limitation of the header. Assembly 450, like assembly 212, is comprised of a front sleeve section 452 which telescopingly receives a rear bar section 454. The front end of the front sleeve section 452 is pivotally connected at 220 between a pair of upstanding spaced apart tabs 222 being fixed at a central location on an upper side of the cross channel member 214. The front end of the rear bar section 454 is received through the rear end of the front sleeve section 452. The rear end of rear bar section 454 is pivotally connected at 224 between a pair of forwardly projecting tabs 226 being fixed at a central location on generally the forward side of the cross pipe 66 of the wheel frame assembly 54 of the mobile frame 12. Unlike assembly 212, the rear bar section 454 is provided with an elongated slot 456 which extends completely therethrough. Front sleeve section 452 has holes therein through which a cap screw and nut 458 extend. Screw and nut 458 align with slot 456 to limit the maximum and minimum telescopic relationship between sleeve section 452 and bar section 454. Thus, in use, assembly 450 limits the upper and lower positions of the header, while maintaining lateral stability.

As described previously, the pair of upper and lower intermeshing crop conditioner rolls 40,42 are mounted for counter-rotation relative to each other and between left and right spaced apart side members 56,58 of the mobile frame 12. Cut crop being swept over the header floor 28 by the reel tines 38 is received between the rolls 40,42. The crop material upon receipt between the rolls 40,42, is conditioned in a known manner and then propelled by the rotating rolls 40,42 rearwardly below the windrow forming structure 48 and back onto the field. The construction of the rolls 40,42 is substantially the same as that illustrated and described in U.S. Pat. No. 3,513,645.

The lower conditioner roll 42 has a central shaft 228 which extends beyond both ends of the roll and is rotatably mounted at its opposite ends in left and right lower bearing assemblies 230,232, respectively, which are attached to lower portions of the left and right side members 56,58 of the mobile frame 12, as clearly seen in FIGS. 5 and 6.

The upper conditioner roll 40 has a central shaft 234 which extends beyond both ends of the roll and is rotatably mounted at its opposite ends in left and right upper bearing assemblies 236,238, respectively, which are mounted to left and right pivotal levers 240,242 adjacent the forward ends thereof. The left and right levers 240,242 are pivotally mounted at their rear ends at 244,246 between respectively left and right side members 56,58 and corresponding left and right brackets 248,250 being spaced therefrom and attached to respective rear flanges 82,88 on the left and right side members 56,58.

From the foregoing description, it is seen that the upper conditioner roll 40 is mounted for pivotal movement toward and away from the lower conditioner roll 42 to permit foreign objects and heavy loads of crop material to pass between the rolls 40,42 without plugging the machine 10.

As partially seen in each of FIGS. 3 through 10, a control mechanism, generally designated 252, is provided on the frame 12 to permit pivotal movement of the upper roll 40 relative to the lower roll 42, while at the same time bias the upper roll 40 against the lower roll 42 at a sufficient level of pressure to insure adequate conditioning of the crop material passing between the rolls 40,42.

The control mechanism 252 basically includes a pair of left and right axially aligned torsion bars 254,256 extending generally parallel to the upper roll 40, above the latter and below the upper cross frame structure 52, and through the left and right side members 56,58 of the mobile frame, a pair of left and right crank arms 258,260 interconnecting the opposite outer ends of the torsion bars 254,256 with the respective forward free ends of the left and right pivotal levers 240,242 which rotatably mount the opposite ends of the upper roll shaft 234, and a torsion adjusting assembly, generally designated 262, being coupled to the adjacent inner ends of the torsion bars 254,256.

The left and right crank arms 258,260 at their forward ends respectively fixedly mount axially transverse inwardly extending hubs 264,266 having hexagonal shaped central internal bores respectively adapted to snugly receive hexagonal shaped outer ends of the torsion bars 254,256. The respective inner end portions of the hubs 264,266 are rotatably mounted in left and right bushings 268 (only the left bushing being seen in FIG. 10) respectively secured in left and right brackets 270,272 which are fixed to and depend from the underside of the upper cross frame structure 52 adjacent the outer sides of the left and right side members 56,58 of the mobile frame 12. A clip 274 is attached to each of the crank arms 258,260 adjacent the hubs 264,266 thereof and overlies the outer end surface of each of the torsion bars 254,256 so as to prevent the latter from undergoing axial movement. By such arrangement, the left torsion bar outer end, left hub 264 and left crank arm 258 are secured together as a unit which is rotatably journalled in the left bushing 268. The same is true of the right torsion bar outer end, right hub 266 and right crank arm 260.

The left and right crank arms 258,260 at their forward free ends are respectively interconnected to the forward free ends of the upper roll left and right pivotal levels 240,242 by left and right pairs of vertical links 276,278 (only the left pair of links 276 being seen in FIG. 10).

The upper and lower ends of the link pairs 276,278 at 280 and 282 are respectively pivotally connected to the free forward ends of the crank arms 258,260 and the free forward ends of the pivotal levers 240,242.

As seen in FIGS. 5 and 6, the upper roll 40 is disposed in its normal operative position closely adjacent the lower roll 42 wherein the peripheral ribs and recesses on the rolls intermesh. In such lower position, lower shoulders, 284,286 respectively fixed to the lower forward edges of the left and right pivotal levers 240,242 abut and rest on rubber blocks 288,290 respectively attached to the outer sides of the left and right side members 56,58. The levers 240,242 may pivot upwardly until upper shoulders 292,294, which are respectively attached to the outer sides of levers 240,242 and extend above the upper forward edges of the levers 240,242, abut the respective lower sides of the left and right crank arms 258,260.

The torsion adjusting assembly 262 is coupled to the adjacent inner ends of the torsion bars 254,256, such inner ends each being of hexagonal shape similar to that of the outer bar ends. The assembly 262 includes a pair of lever arms 296,298 having respective axially transverse extending hubs 300,302 fixedly mounted on their forward ends which have hexagonal shaped central bores adapted to snugly receive the respective hexagonal shaped inner ends of the torsion bars 254,256, as seen in FIGS. 4 and 7 through 9. The hubs 300,302 are axially aligned, received within and supported by a cylindrical sleeve 304 which is received through and secured to a pair of spaced apart gussets 306 fixed to and depending from the upper cross frame structure 52 at a generally intermediate location therealong. By such arrangement, the left torsion bar inner end, left hub 300 and left lever arm 296 are secured together as a unit which is rotatably journalled in the left half of the cylindrical sleeve 304. The same is true of the right torsion bar inner end, right hub 302 and right lever arm 298.

The torsion adjusting assembly 262 further includes a bell crank 308 formed by two identical side-by-side spaced apart generally L-shaped plates 310,312 which at their middle portions are rigidly interconnected by a transverse sleeve 314. The bell crank 308 is mounted for pivotal movement about a generally fore-and-aft extending axis of a pin 316 which is received through the bell crank sleeve 314 and secured at its opposite ends to the front and rear vertical legs 318,320 of an inverted U-shaped bracket 322 fixed to and depending from the upper cross frame structure 52 rearwardly of the location of securement of the gussets 306 to the frame structure 52. A device 324 respectively having ball-and-socket joint assemblies 326,328 at its opposite ends pivotally interconnects the upper right free end of the bell crank 308 at 330 with the rear free ends of the lever arms 296,298 at 332 so as to cause rotation of the lever arms 296,298 about the coincident transverse extending axes of the torsion bars 254,256 upon rotation of the bell crank 308 about the fore-and-aft extending axis of the mounting pin 316. The lower left free end of the bell crank 308 pivotally mounts an internally threaded sleeve 334 about generally fore-and-aft extending coincident axes of projections 336,338 fixed on opposite sides of the sleeve 334.

The torsion adjusting assembly 262 finally includes a transversely extending shaft 340 being rotatably mounted near its right end in the right side member 58 and having a hand actuated crank 342 pivotally attached to its right end. The opposite left end of the transverse shaft 340 is threaded and received within the internally threaded sleeve 334. The hand crank 342 is normally retained in a stored position as seen in FIGS. 6 (and in solid line form in FIG. 7) by a hook element 344 mounted to and projecting rearwardly from the rear edge flange 88 on the right side member 58. When the hand crank 342 is moved to its operative position, as seen in broken line form in FIG. 7, by turning the crank 342 in a predetermined direction the pressure imposed by the upper conditioner roll 40 upon the lower conditioner roll 42 may be regulated. Particularly, when the hand crank 342 is turned clockwise, as viewed from the right side of the machine 10, the sleeve 334 is moved along the rotating shaft 340 toward the hand crank 342 and correspondingly pivots the bell crank 308 counterclockwise, as viewed from the right side of the machine 10. Clockwise rotation of the lever arms 296,298 results in the inner ends of the torsion bars 254,256 rotating clockwise relative to the outer ends thereof and an increase in the torsional stress imposed on the torsion bars 254,256 which translates into an increase in the magnitude of the downwardly-directed force imposed by the left and right crank arms 258,260 on the ends of the upper roll 40 via the interconnection therewith provided by the left and right link pairs 276,278 and pivotal levers 240,242. When the hand crank 342 is turned counterclockwise, the sleeve 334 is moved along the rotating shaft 340 away from the hand crank 342 and correspondingly pivots the bell crank 308 clockwise which, in turn, rotates the lever arms 296,298 counterclockwise resulting in a decrease in the torsional stress imposed on the torsion bars 254,256 which translates into a decrease in the magnitude of the downwardly-directed force imposed on the ends of the upper roll 40.

Figure 13:
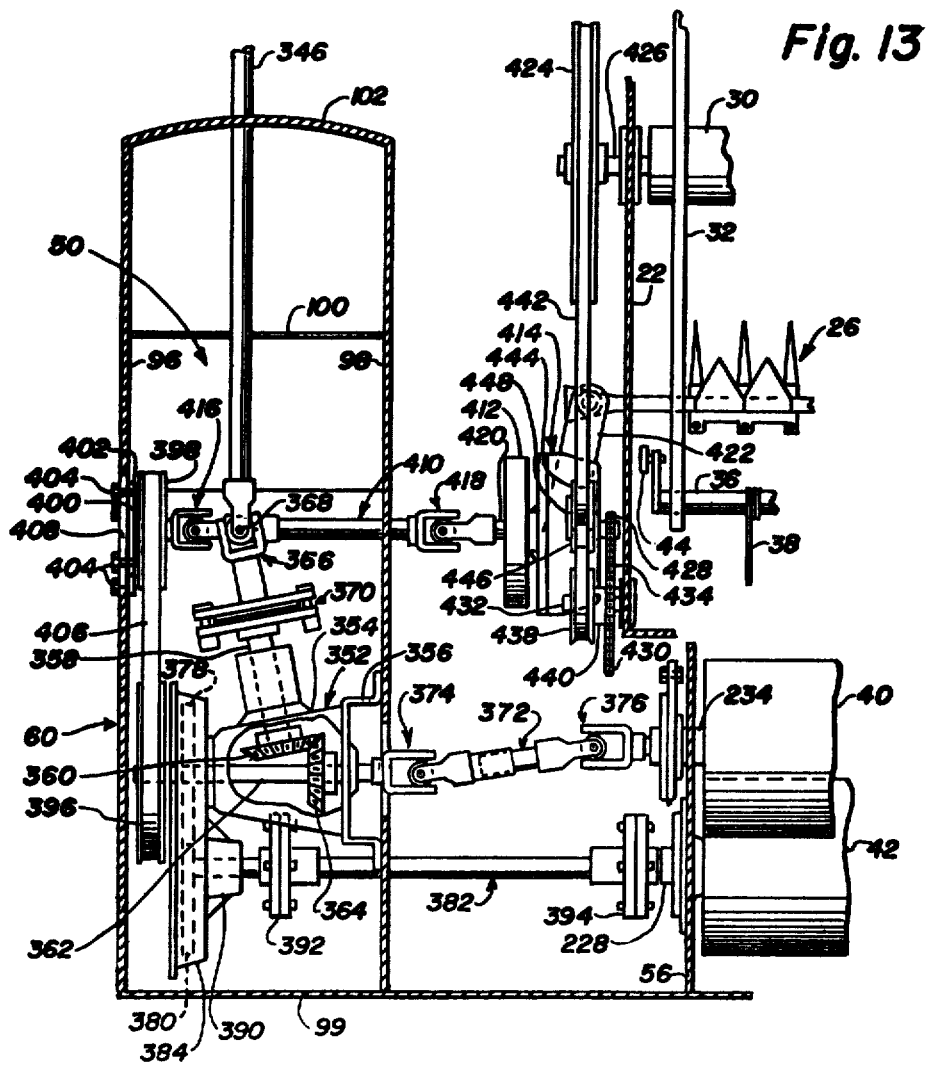
FIG. 13 is an enlarged fragmentary plan view, partly in section, of the various drive components for transmitting rotary power to the conditioner rolls, reel and cutterbar of the machine.

As briefly mentioned hereinabove, rotary driving power is transmitted from the power takeoff shaft (not shown) of the towing tractor (not shown) to the reel 20, cutterbar 26 and conditioner rolls 40,42 of the harvesting machine 10 by the drive arrangement 50, best illustrated in FIG. 13 and partially seen in FIGS. 1, 3, 7 and 12.

The drive arrangement 50 includes an input driveline being comprised by a rear input drive shaft 346, being disposed and extending axially within the hollow interior of the elongated straight main portion 112 of the tongue 14 (the tongue being omitted in FIG. 13 for purposes of clarity), and a forward input telescopible drive shaft assembly 348 (only partially shown in FIGS. 1 and 12) having a forward universal joint (not shown) and a rear universal joint 350 for respectively articulately drivingly coupling the front and rear ends of the assembly 348 to the tractor pto shaft (not shown) and to the forward end of the rear input drive shaft 346 at the location of a front open end of the main tongue portion 112. The forward telescoping drive shaft assembly 348 transmits the rotary motion of the tractor pto shaft to the rear input drive shaft 346.

The drive arrangement 50 further includes a gearbox assembly 352 stationarily disposed within the box-like housing 60 of the mobile frame 12. The assembly 352 includes a housing 354 being mounted to the interior side of the inner vertical side wall 98 of the box-like housing 60 by a bracket 356. The housing 354 contains and rotatably mounts an input shaft 358 which extends outwardly from the forward side of the housing 354 and has a driving bevel gear 360 secured to the rear end of the shaft 358. Also, a transverse output shaft 362 is contained and rotatably mounted in the housing 354 which extends laterally beyond the right and left sides of the housing 354. A driven bevel gear 364 which drivingly intermeshes with the driving bevel gear 360 is located within the housing 354, being secured on the output shaft 362 near the right exteriorly extending end portion of the shaft 362.

A universal joint assembly 366 extends through the rear open end of the main tongue portion 112 and is secured on and articulately drivingly interconnects at 368 (FIGS. 1 and 13) the rear end of the rear input drive shaft 346 and the forward end of input shaft 358 of the gearbox assembly 352 so as to transmit rotary motion from the rear input drive shaft 346 to the driving bevel gear 360 in the housing 354. As seen in FIG. 1, articulate drive connection 368 between shafts 346,358 is vertically aligned with the pivotal connection provided by fasteners 116,118 of the rear of the tongue 14 with the upper and lower cross braces 106,108 within the box-like housing 60. A slip clutch 370 is operatively interposed between the universal joint assembly 366 and the gearbox input shaft 358 to provide overload protection for the drive arrangement.

The drive arrangement 50 also includes various components, which will be described hereinafter, for transmitting rotary motion of the output shaft 362 of the gearbox assembly 352 to the reel 20, cutterbar 26 and the conditioner rolls 40,42.

Rotary motion is transmitted from the right end of the gearbox output shaft 362 to the left end of the central shaft 234 of the upper vertically-movably mounted conditioner roll 40 by a telescopible drive shaft assembly 372 which extends through an opening in the inner side wall 98 of box-like housing 60 and has left and right end universal joints 374,376 for respectively articulately drivingly coupling the output shaft 362 and the upper roll shaft 234 so as to also accommodate vertical movement of the upper roll 40.

Rotary motion is transmitted to the left end of the central shaft 228 of the lower stationarily-mounted conditioner roll 42 from the left end portion of the gearbox output shaft 362 through upper and lower gears 378,380 having a 1:1 ratio and a transverse drive shaft 382. The upper and lower rolls 40,42 are thereby rotated at the same peripheral speeds. The upper gear 378 is secured on the left end portion of the gearbox output shaft 362 for rotation therewith and drivingly intermeshes with the lower gear 380 which is secured on the left end of the transverse drive shaft 382. The gears 378,380 are both contained within a casing 384 which is secured to the left side of the gearbox assembly housing 354 and also at 386 to a bracket 388 (FIG. 1) fixed on and projecting upwardly from the bottom wall 99 of the box-like housing 60. The left end portion of the transverse drive shaft 382 is rotatably mounted through a hub portion 390 of the casing 384 while its right end portion is drivingly coupled to the left end of the lower conditioner roll central shaft 228. A pair of couplers 392,394 are interposed between sections of the transverse drive shaft 382.

Rotary motion is also transmitted to the reel 20 and cutterbar 26 from the left end portion of the gearbox output shaft 362. A first sheave 396 is mounted on the left end of the gearbox output shaft 362 outwardly of the upper gear 378 for rotation with the shaft 362. A second sheave 398 is rotatably mounted forwardly of the first sheave 396 on a stub shaft 400 fixed to and extending inwardly from a plate 402 which is fastened to the inner side of the outer side wall 96 of the box-like housing 60 by bolts 404. An endless flexible belt 406 which transmits the rotary motion of the first sheave 396 to the second sheave 398 is entrained over and extends between the sheaves 396,398. The tension in the belt 406 may be adjusted by loosening the bolts 404, moving the plate 402 in an appropriate direction generally fore-and-aft along a pair of slots 408 (FIG. 1) formed through the outer side wall 96 and then retightening the bolts 404 when the desired level of tension has been provided in the belt 406. The rotary motion of the second sheave 398 is transmitted by a telescopible drive shaft assembly 410 to a flywheel 412 of a wobble drive assembly 414 mounted on the header left side sheet 22, which wobble assembly 414 is operatively interconnected with and reciprocably drives the cutterbr 26 in a conventional manner. The telescopible drive shaft assembly 410 has left and right end universal joints 416,418 for respectively articulated drivingly coupling the inner side of the second sheave 398 and the left end of a central shaft 420 of the wobble assembly 414, on which the flywheel 412 is secured, so as to also accommodate vertical movement of the header 18 relative to the box-like housing 60.

The rotary motion of the central shaft 420 of the wobble assembly 414 is not only translated into reciprocatory pivotal motion of wobble assembly drive arm 422 which, in turn, reciprocably moves the cutterbar 26, but also is transmitted to a large diameter sheave 424 secured on a stub shaft 426 which extends axially from the left end of the central shaft 30 of the reel 20. Particularly, a small diameter sprocket 428 is secured on the right end of the wobble assembly central shaft 420, which end extends outwardly from the right side of the wobble assembly 414 as seen in FIG. 13. A large diameter sprocket 430, which is rotatably mounted on a sutb shaft 432 being fixed on and extending outwardly toward the box-like housing 60 from the left side sheet 22 of the header 18, is drivingly coupled to the small diameter sprocket 428 by a chain 434 which is entrained over and extends between the sprockets 428,430. An idler sprocket 436 (FIG. 1) is mounted to the header side sheet 22 adjacent the chain 434 and adjustably movable toward and away from the chain 434 in order to take up the slack in the chain 434 or to permit its removal from the sprockets for servicing or repair purposes. The large diameter sprocket 430 is affixed to and co-axially aligned with a small diameter sheave 438 by a hub 440 which extends between and interconnects the sprocket 430 and sheave 438, as seen in FIG. 13, the latter thereby also being rotatably mounted on the stub shaft 432. An endless belt 442 is entrained about and extends between the small diameter sheave 438 and the large diameter sheave 424 on the left end of the central shaft 30 of the reel 20. Also, the belt 442 is entrained about a pair of idler sheaves 444,446 (FIG. 1) which are rotatably mounted on an arm 448 which is pivotally mounted to the header left side sheet 22 and movable to various angular positions for adjusting the tension in the belt 442.

It will be understood from the various diameter sizes of the sprockets and sheaves that transmit rotary motion from the gearbox output shaft 362 to the reel central shaft 30 that the peripheral speed of rotation of the reel 20 is substantially less than the reciprocatory speed of the cutterbar 26 and the peripheral speed of rotation of the conditioner rolls 40,42.

It is through that the invention and many of its attendant advantages will be understood from the foregoing description and it will be apparent that various changes may be made in the form, construction and arrangement of the parts described without departing from the spirit and scope of the invention or sacrificing all of its material advantages, the form hereinbefore described being merely an exemplary embodiment thereof.

Having thus described the invention, what is claimed is:

1. In a crop harvesting machine having a crop harvesting header, a mobile frame adapted to move across a field in a forward direction, said mobile frame including upper frame structure extending transversely to said forward direction and a lower wheel frame assembly, said assembly including a cylindrical member extending transversely to said forward direction and rotatably mounted to and supporting said upper frame structure, and lift means on said frame and being actuatable for moving said lower wheel frame assembly, and thereby rotating said cylindrical member thereof, relative to said upper frame structure to effectuate raising of said upper transverse frame structure and said cylindrical member relative to the field between a lower field operating position and an upper transport position, an improved means for suspending said header from said mobile frame so as to dispose said header in a harvesting position adjacent the field when said frame is at its lower field operating position and for lifting said header upwardly relative to the field during effectuation of raising of said frame, comprising:

upper means pivotally interconnecting said upper frame structure with an upper portion of said header;

lower elongated means pivotally interconnecting said cylindrical member of said wheel frame assembly with a lower portion of said header, said lower means having a portion which projects rearwardly of the pivotal connection of said lower means with said cylindrical member and underlies said member so as to be engaged by the same to effect lifting of said header upwardly by said lower means upon rotation of said cylindrical member when said lift means is actuated so as to effectuate raising of said upper transverse frame structure and said cylindrical member relative to the field; and header stabilizing means extending between and pivotally interconnecting a generally central portion of said cylindrical member and a lower generally central portion of said header.

2. The machine as recited in claim 1, wherein said header stabilizing means is comprised by a pair of telescopible members.

3. The machine as recited in claim 2, wherein said telescopible members further include interacting stop means which limit the maximum and minimum telescoping movement therebetween.

4. The machine as recited in either claims 2 or claim 3, wherein said pair of telescopible members comprise a sleeve member affixed at one end to said cylindrical member and a bar member affixed at one end to said header, said bar member extending at least partially into said sleeve member in a telescoping fashion.

5. The machine as recited in claim 4, wherein said bar member has an elongate slot formed therethrough with an axis substantially parallel to the telescopic movement, and said sleeve member includes a bolt extending therethrough and through said slot to thereby limit the relative telescopic movement between said sleeve member and said bar member.

6. In a crop harvesting machine having a crop harvesting header, a mobile frame adapted to move across a field in a forward direction, said mobile frame including upper frame structure extending transversely to said forward direction and a lower wheel frame assembly, said assembly including a cylindrical member extending transversely to said forward direction and rotatably mounted to and supporting said upper frame structure, and lift means on said frame and being actuatable for moving said lower wheel frame assembly, and thereby rotating said cylindrical member thereof, relative to said upper frame structure to effectuate raising of said upper transverse frame structure and said cylindrical member relative to the field between a lower field operating position and an upper transport position, an improved means for suspending said header from said mobile frame so as to dispose said header in a harvesting position adjacent the field when said frame is at its lower field operating position and for lifting said header upwardly relative to the field during effectuation of raising of said frame, comprising:

upper means pivotally interconnecting said upper frame structure with an upper portion of said header;

lower means pivotally interconnecting said cylindrical member of said wheel frame assembly with a lower portion of said header so as to effect upward lifting of said header upon rotation of said cylindrical member when said lift means is actuated to effectuate raising of said upper transverse frame structure and said cylindrical member relative to the field; and a pair of telescopible members spaced from said lower means extending between and interconnecting a generally central portion of said cylindrical member with a lower generally central portion of said header for stabilizing said header against the effect of any laterally directed forces which may impinge thereon.

7. The machine as recited in claim 6, wherein said telescopible members further include interacting stop means which limit the maximum and minimum telescoping movement therebetween.

8. The machine as recited in claim 7 wherein said at least one pair of telescopible members comprise a sleeve member affixed at one end to said cylindrical member and a bar member affixed at one end to said header, said bar member extending at least partially into said sleeve member in a telescoping fashion.

9. The machine as recited in claim 8, wherein said bar member has an elongate slot formed therethrough with an axis substantially parallel to the telescopic movement, and said sleeve member includes a bolt extending therethrough and through said slot to thereby limit the relative telescopic movement between said sleeve member and said bar member.

* * * * *